(12) United States Patent  (10) Patent No.: US 8,594,038 B2
Feng et al.  (45) Date of Patent: Nov. 26, 2013

(54) RESOURCE CONFIGURATION METHOD AND DEVICE

(75) Inventors: Shulan Feng, Beijing (CN); Jinnan Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 13/486,805

(22) Filed: Jun. 1, 2012

(65) Prior Publication Data

US 2012/0243455 A1  Sep. 27, 2012

Related U.S. Application Data

(63) Continuation of application No. PCT/CN2010/079160, filed on Nov. 26, 2010.

(30) Foreign Application Priority Data

Dec. 14, 2009  (CN) .......................... 2009 1 0188871

(51) Int. Cl.
*H04W 4/00* (2009.01)
*H04W 72/00* (2009.01)
*H04B 7/00* (2006.01)

(52) U.S. Cl.
USPC ............................ 370/329; 455/450; 455/509

(58) Field of Classification Search
None
See application file for complete search history.

(56) References Cited

U.S. PATENT DOCUMENTS

| 7,006,810 | B1 | 2/2006 | Winters et al. |
| 7,327,983 | B2 | 2/2008 | Mehta et al. |
| 7,603,081 | B2 * | 10/2009 | Karabinis .................... 455/12.1 |
| 8,032,093 | B1 * | 10/2011 | Epperson et al. .......... 455/114.1 |
| 8,140,024 | B2 * | 3/2012 | Prasad et al. .................... 455/69 |
| 8,243,649 | B2 * | 8/2012 | Yim et al. ...................... 370/315 |
| 8,428,168 | B1 * | 4/2013 | Zhang et al. ................... 375/267 |
| 8,483,200 | B2 * | 7/2013 | Cha et al. ....................... 370/339 |
| 2007/0099584 | A1 | 5/2007 | Niu et al. |
| 2008/0080446 | A1 | 4/2008 | Chung |

FOREIGN PATENT DOCUMENTS

| CN | 1732698 A | 2/2006 |
| CN | 101005343 A | 7/2007 |
| CN | 101154967 A | 4/2008 |
| CN | 101405957 A | 4/2009 |

OTHER PUBLICATIONS

Partial translation of Office Action dated Feb. 16, 2013 in connection with Chinese Patent Application No. 200910188871.X.
Written Opinion of the International Searching Authority dated Mar. 10, 2011 in connection with International Patent Application No. PCT/CN2010/079160.
International Search Report dated Mar. 10, 2011 in connection with International Patent Application No. PCT/CN2010/079160.

* cited by examiner

*Primary Examiner* — Clemence Han

(57) ABSTRACT

A resource configuration method and device are provided. The method includes: obtaining a capability of a user equipment, and obtaining multiple resource configuration manners according to the capability of the user equipment; obtaining a resource configuration manner in which data bearing capacity meets a service requirement from the multiple resource configuration manners; and when it is required to save power of the user equipment, selecting a resource configuration manner in which the least radio frequency chains are used from the resource configuration manners in which the data bearing capacity meets the service requirement, and in the resource configuration manner in which the least radio frequency chains are used, configuring, for the user equipment, a component carrier and the radio frequency chain used by each component carrier.

10 Claims, 3 Drawing Sheets

RESOURCE CONFIGURATION METHOD AND DEVICE

CROSS-REFERENCE TO RELATED APPLICATIONS

This application is a continuation of International Application No. PCT/CN2010/079160, filed on Nov. 26, 2010, which claims priority to Chinese Patent Application No. 200910188871.X, filed on Dec. 14, 2009, both of which are hereby incorporated by reference in their entireties.

TECHNICAL FIELD

The present invention relates to the field of communications technologies, and in particular, to a resource configuration method and device.

BACKGROUND

With the rapid development of radio services, requirements on the transmission rate become higher and higher. International Mobile Telecommunications-Advanced (IMT-ADVANCED) sets a goal of a maximum transmission rate of 1 Gbits/s. To achieve such a high transmission rate, a multi-carrier aggregation technology is put forward in the industry. That is, multiple carriers serve one terminal simultaneously. The multiple carriers may be continuous or discontinuous, and may be in a same band or in different bands. For example, in a 3GPP LTE (Long Term Evolution, long term evolution) system, the maximum transmission bandwidth is 20 MHz. To support 1 GHz transmission, multiple continuous or discontinuous carriers less than or equal to 20 MHz may be aggregated together to serve one system simultaneously. If an interval between the aggregated carriers is relatively large, the multiple aggregated carriers are incapable of sharing a same radio frequency chain. For example, in LTE-A (LTE-advanced, LTE-advanced), if 2 wave bands which have respective center frequencies of 2.5 GHz and 3.5 GHz are aggregated together, each carrier needs to have its respective radio frequency chain. FIG. 1 is a schematic structural diagram of a transceiver in a multi-carrier aggregation case. In a case that the MIMO (Multiple input multiple output, multiple input multiple output) technology is not used, one transmit antenna or receive antenna may correspond to multiple radio frequency chains, and each radio frequency chain corresponds to one or more carriers. In this case, baseband signals need to undergo a series of processing and combination in the radio frequency chain, so as to be transmitted by the transmit antenna. The signal received by the receive antenna needs to be divided by a demultiplexer into multiple radio frequency chains, where each radio frequency chain corresponding to a carrier performs down conversion, and then undergoes processing and changes into a baseband signal. To improve system capacity, the MIMO technology will be commonly used in a future communication system. That is, multiple antennas will be used at the transmit end and the receive end. FIG. 2 is a schematic structural diagram of a MIMO transceiver under a single-carrier condition. After being processed, the baseband signals may be transmitted through multiple antennas, or the signals are received through multiple antennas and processed into baseband signals.

In a future radio communication system, the carrier aggregation technology and the MIMO technology may be used simultaneously. Therefore, a communication system is put forward in the prior art, so that each component carrier use all antennas in a multi-antenna carrier aggregation scenario. However, such a setting manner consumes more resources.

SUMMARY

Embodiments of the present invention provide a resource configuration method and device.

According to an embodiment of the present invention, a resource configuration method is provided and includes:

obtaining a capability of a user equipment, and obtaining multiple resource configuration manners according to the capability of the user equipment, where the capability of the user equipment includes the number of antennas of the user equipment and the number of radio frequency chains that corresponds to each antenna, and each resource configuration manner includes the number of component carriers that is configured for the user equipment and a state of a radio frequency chain used by each component carrier;

obtaining a resource configuration manner in which data bearing capacity meets a service requirement from the multiple resource configuration manners; and when it is required to save power of the user equipment, selecting a resource configuration manner in which the least radio frequency chains are used from the resource configuration manners in which the data bearing capacity meets the service requirement, and in the resource configuration manner in which the least radio frequency chains are used, configuring, for the user equipment, a component carrier and the radio frequency chain used by each component carrier.

According to another embodiment of the present invention, a resource configuration device is provided and includes:

a configuration manner obtaining unit, configured to obtain a capability of a user equipment, and obtain multiple resource configuration manners according to the capability of the user equipment, where the capability of the user equipment includes the number of antennas of the user equipment and the number of radio frequency chains that corresponds to each antenna, and each resource configuration manner includes the number of component carriers that is configured for the user equipment and a state of a radio frequency chain used by each component carrier;

a service requirement judging unit, configured to obtain a resource configuration manner in which data bearing capacity meets a service requirement from the multiple resource configuration manners; and a first configuration executing unit, configured to: when it is required to save power of the user equipment, select a resource configuration manner in which the least radio frequency chains are used from the resource configuration manners in which the data bearing capacity meets the service requirement, and in the resource configuration manner in which the least radio frequency chains are used, configure, for the user equipment, a component carrier and the radio frequency chain used by each component carrier.

BRIEF DESCRIPTION OF THE DRAWINGS

To illustrate the technical solutions in embodiments of the present invention or the prior art more clearly, accompanying drawings to be used in the description of the embodiments or the prior art are introduced briefly in the following. Apparently, the accompanying drawings in the following description are only some embodiments of the present invention, and persons of ordinary skill in the art may further derive other drawings according to these drawings without creative efforts.

DETAILED DESCRIPTION

The technical solutions in the embodiments of the present invention are described clearly and completely in the following with reference to the accompanying drawings in the embodiments of the present invention. Apparently, the described embodiments are only a part rather than all of the embodiments of the present invention. All other embodiments derived by persons of ordinary skill in the art based on the embodiments of the present invention without creative efforts shall fall within the protection scope of the present invention.

Figure 1:
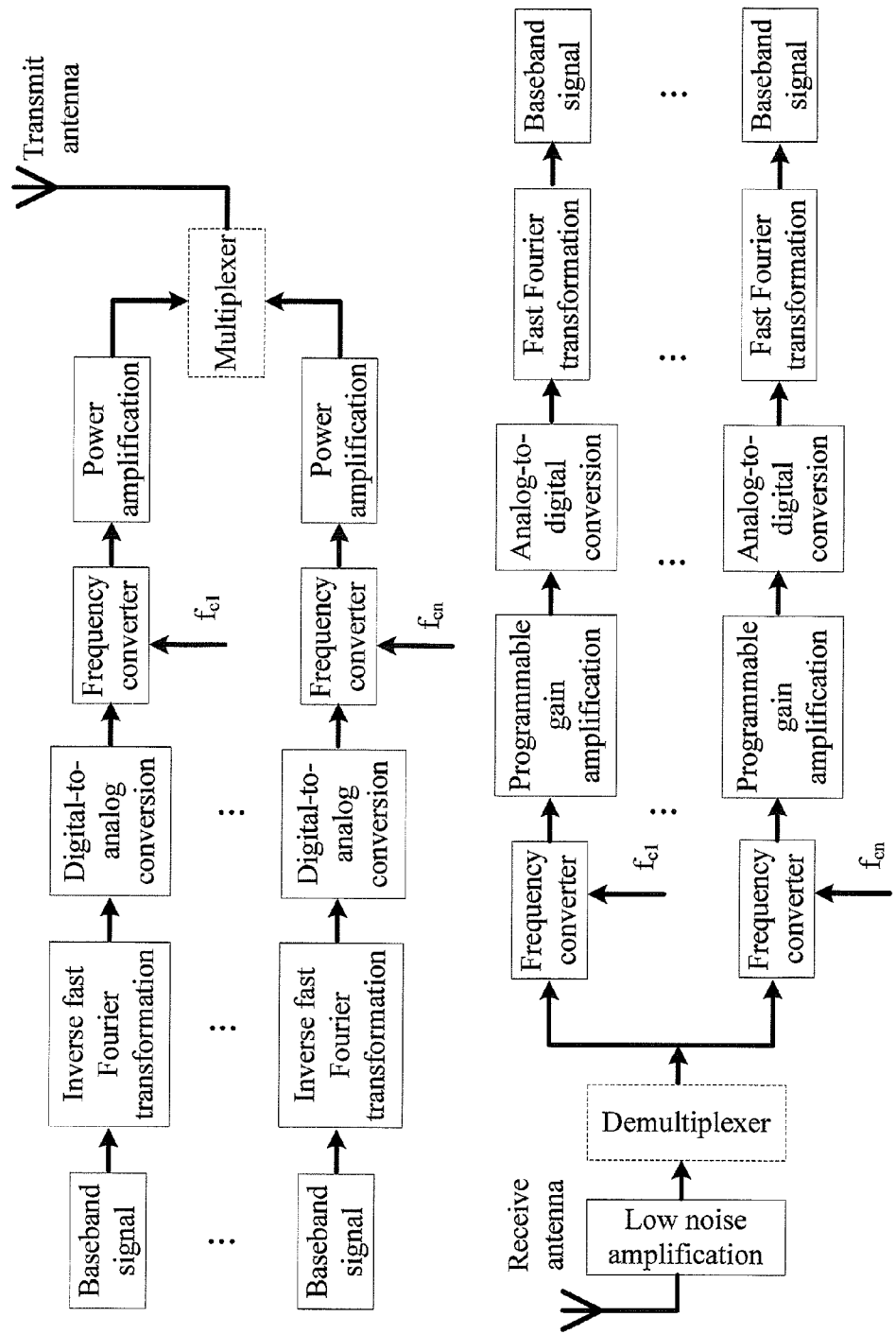
FIG. 1 is a schematic structural diagram of a transceiver in a multi-carrier aggregation case.
Figure 2:
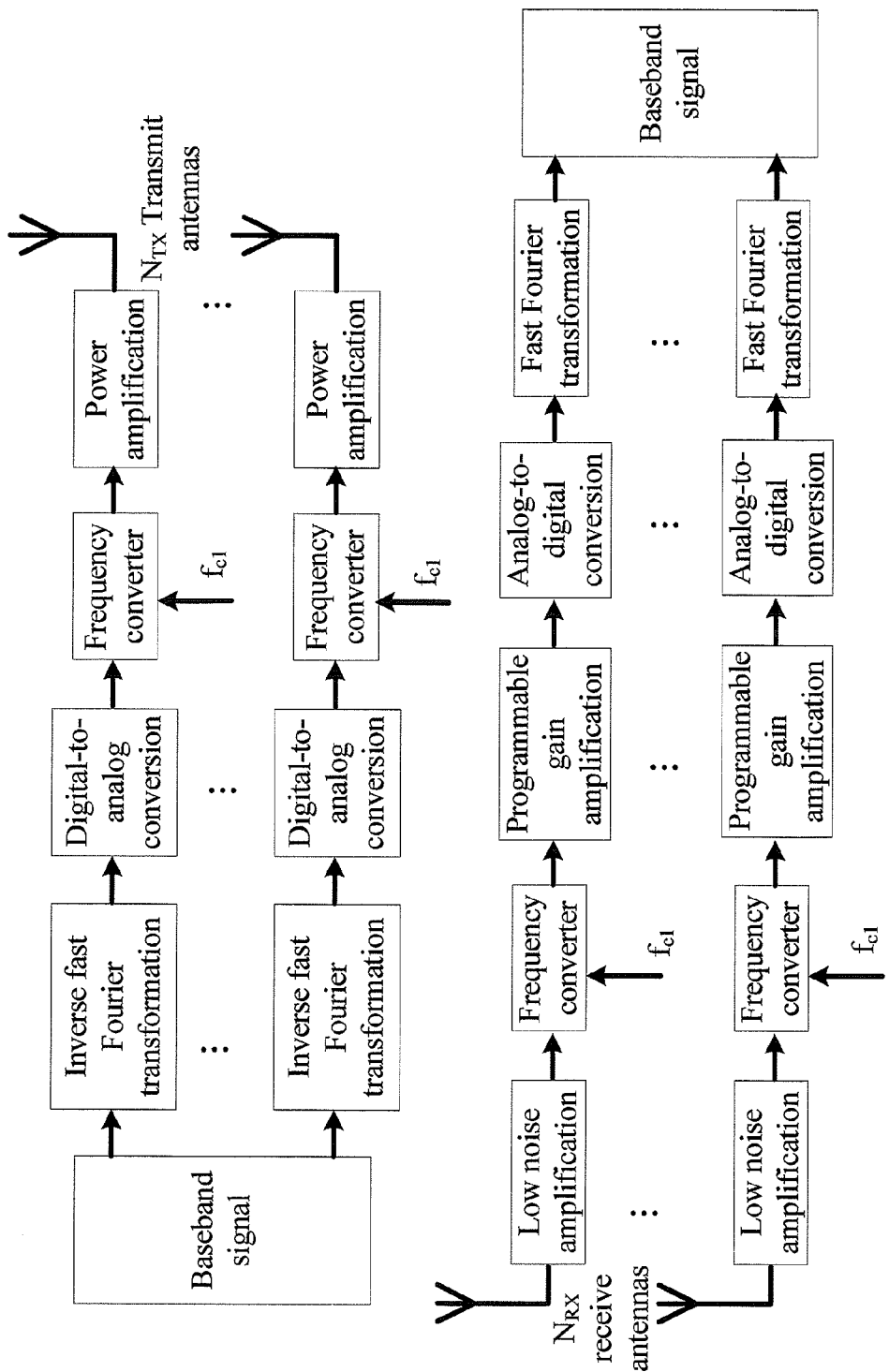
FIG. 2 is a schematic structural diagram of a MIMO transceiver under a single-carrier condition.
Figure 3:
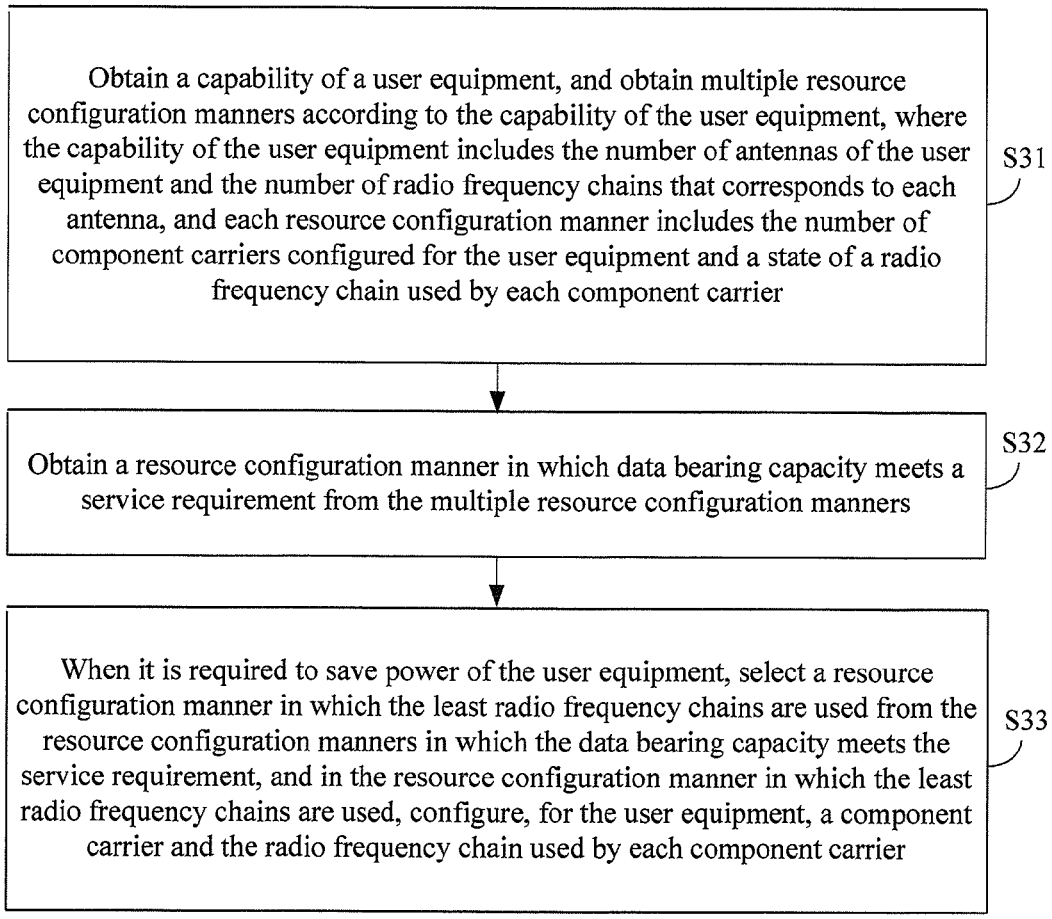
FIG. 3 is a schematic diagram of a resource configuration method according to an embodiment of the present invention.

FIG. 3 is a schematic diagram of a resource configuration method according to an embodiment of the present invention. The method includes:

S31. Obtain a capability of a user equipment, and obtain multiple resource configuration manners according to the capability of the user equipment, where the capability of the user equipment includes the number of antennas of the user equipment and the number of radio frequency chains that corresponds to each antenna, and each resource configuration manner includes the number of component carriers that is configured for the user equipment and a state of a radio frequency chain used by each component carrier.

S32. Obtain a resource configuration manner in which data bearing capacity meets a service requirement from the multiple resource configuration manners.

S33. When it is required to save power of the user equipment, select a resource configuration manner in which the least radio frequency chains are used from the resource configuration manners in which the data bearing capacity meets the service requirement, and in the resource configuration manner in which the least radio frequency chains are used, configure, for the user equipment, a component carrier and the radio frequency chain used by each component carrier.

In this embodiment, the resource configuration manners in which the data bearing capacity meets the service requirement are obtained; and, when it is required to save power of the user equipment, the resource configuration manner in which the least radio frequency chains are used is selected from the resource configuration manners in which the data bearing capacity meets the service requirement, so as to configure resources for the user equipment, so that the user equipment can complete a communication service by using the least radio frequency chains. Thereby, the used radio frequency chain resources are reduced, and the power of the user equipment is saved.

Further, the method further includes: when it is required to save a bandwidth resource, selecting a resource configuration manner in which the least component carriers are used from the resource configuration manners in which the data bearing capacity meets the service requirement, and in the resource configuration manner in which the least component carriers are used, configuring, for the user equipment, a component carrier and the radio frequency chain used by each component carrier. Because the resource configuration manner with the least component carriers is used, the effect of saving a bandwidth resource may be achieved.

Further, the resource configuration method may be used dynamically or half-statically for resource configuration. The resource configuration method may be completed by a base station (eNodeB) or a user equipment (UE, User Equipment). After completing the resource configuration, a base station may notify a result of the resource configuration to the user equipment, where the result of the resource configuration includes the number of component carriers allocated to the user and the number of antennas used by each component carrier. Further, when the user equipment is powered on initially, an initial configuration manner may be used for configuring resources. There may be multiple initial configuration manners. In an initial configuration manner, one radio frequency chain may be configured for the user equipment, so as to save power of the user equipment; or multiple radio frequency chains may be configured for the user equipment, so that different radio frequency chains serve different component carriers, so as to quicken initial access of the user equipment; or it is configured that one radio frequency chain is opened for each antenna, so that the opened radio frequency chains serve a same component carrier. In this embodiment, the antenna may be categorized into a transmit antenna or a receive antenna. Accordingly, the radio frequency chain may also be categorized into a transmit radio frequency chain or a receive radio frequency chain. For example, the capability of the user equipment may include: the number of transmit antennas, the number of transmit radio frequency chains corresponding to each transmit antenna, the number of receive antennas, and the number of receive radio frequency chains corresponding to each receive antenna. In practical application, multiple resource configuration manners exist. In each configuration manner, multiple component carriers may be configured for the user equipment, and each component carrier may use radio frequency chains of one or more antennas. However, one component carrier does not occupy two radio frequency chains of one antenna simultaneously. Therefore, the number of radio frequency chains used by each component carrier represents the number of antennas used by the component carrier. Generally, one radio frequency chain is used to transmit one carrier only. In some cases, however, one radio frequency chain may also be used to transmit multiple carriers. In practical application, the base station may configure a transmit carrier of the user equipment, the number of antennas used by each transmit carrier, a receive carrier of the user equipment, and the number of antennas used by each receive carrier. Definitely, the base station may also configure only the transmit carrier of the user equipment and the number of antennas used by each transmit carrier, and the user equipment itself determines the number of receive carriers and the number of antennas used by each receive carrier. Alternatively, the base station may also configure only the transmit carriers of the user equipment, the number of antennas used by each transmit carrier, and the number of receive carriers, and the user equipment itself determines the number of antennas used by each receive carrier thereof.

Further, the capability of the user equipment may further include: maximum transmit or receive bandwidth supported by each radio frequency chain, or maximum transmit or receive power supported by each radio frequency chain. In a practical application, the base station may obtain the capability of the user equipment by obtaining a radio frequency capability parameter of the user equipment. The manner of obtaining the radio frequency capability parameter of the user equipment is similar to the manner of obtaining a parameter of another capability of the user equipment. For example, the user equipment may store its own radio frequency capability parameter locally, and report its radio frequency capability to the base station at the time of initial access. When executing handover, a serving base station may notify the radio frequency capability of a subordinate user equipment thereof to a target base station through signaling between base stations. Alternatively, the radio frequency capability of the user equipment may be stored in a specific node, such as an MME (Mobility Management Entity, mobility management entity). After the user equipment accesses the base station, the base station may obtain the radio frequency capability of the user equipment by accessing the MME. The radio frequency capability parameter of the user equipment may also be bundled with other capability parameters of the user equipment and transmitted to the base station. The manner of the base station obtaining the radio frequency capability parameter of the user equipment may be similar to the manner of obtaining another capability parameter of the user equipment, and is not limited in this embodiment.

For ease of understanding, the following gives specific illustration with a transmit end as an example. In the following illustration, a user equipment is referred to as a terminal (Terminal) for short. It is assumed that the terminal has $N_{Tx}$ transmit antennas and a $j^{th}$ transmit antenna has $P_j$ transmit radio frequency chains, where $j=1, \ldots, N_{Tx}$; a service rate required by the terminal is $R_u$; $C_{Tx}$ is the configured total number of transmit carriers, and $S_l$ is the number of transmit radio frequency chains configured for transmit carrier 1. Because one transmit carrier does not occupy multiple radio frequency chains of a same antenna, $S_l$ is the number of transmit antennas of transmit carrier 1. $R_l$ is the amount of data bearable by transmit carrier 1 when the number of transmit antennas is $S_l$. In practical application, the transmit capability may be different for different transmit antenna modes. A method for calculating $R_l$ may be as follows:

$$R_l = W_l \log 2 \det\left(I_{N_{Rx-BS}} + \frac{\gamma_l}{S_l} H H^H\right),$$

where $W_l$ is the maximum bandwidth allocated by transmit carrier 1 to the terminal; $N_{Rx-BS}$ is the number of receive antennas of the base station; $I_{N_{Rx-BS}}$ represents a $N_{Rx-BS}$ unit matrix; H is a complex matrix of $N_{Rx-BS} \times S_l$; the element $h_{i,j}$ of the matrix H represents the channel fading coefficient from the $j^{th}$ transmit antenna of the terminal to an $i^{th}$ receive antenna of the base station; $i=1, \ldots, N_{Rx-BS}$; $j=1, \ldots, S_l$; $H^H$ represents a conjugate-transpose matrix of H;

$$\gamma_l = \frac{E_l}{N_{o,l}}, E_l$$

is the total transmit power of transmit carrier 1; $N_{o,l}$ is noise power of transmit carrier 1; and $$\det\left(I_{N_{Rx-BS}} + \frac{\gamma_l}{S_l} H H^H\right)$$

is a determinant of the matrix $$I_{N_{Rx-BS}} + \frac{\gamma_l}{S_l} H H^H.$$

In the $R_l$ calculation formula above, when $S_l=0$, $R_l=0$. At the time of resource configuration, the configured total number of transmit carriers is less than or equal to the total number of transmit radio frequency chains, that is, $$C_{Tx} \leq \sum_{j=1}^{N_{Tx}} P_j;$$

and the number of transmit antennas configured for transmit carrier 1 is less than or equal to the total number of transmit antennas of the terminal, that is, $S_l \leq N_{Tx}$. If it is required to save power of the terminal as much as possible and to minimize the number of the radio frequency chains used by the terminal, a combination $\{S_1, \ldots, S_l, S_{C_{Tx}}\}$ that makes $$\sum_{l=1}^{C_{Tx}} R_l > R_u$$

and minimum $$\sum_{l=1}^{C_{Tx}} S_l$$

may be sought, where $S_l$ is the number of transmit radio frequency chains of the first transmit carrier. If $S_l=0$, it is indicated that carrier 1 is not configured as a working carrier of the terminal, that is to say, in this case, carrier 1 is closed for the terminal. If the combination $\{S_1, \ldots, S_l, S_{C_{Tx}}\}$ obtained above is used to configure the number of radio frequency chains for each transmit carrier, the number of transmit radio frequency chains used by the terminal is minimized under a condition that the service requirement are fulfilled. If it is required to reduce interference between carriers and to save a bandwidth resource, the terminal may be made to use the least carriers at the time of resource configuration, and then a combination $\{S_1, \ldots, S_l, S_{C_{Tx}}\}$ that makes $$\sum_{l=1}^{C_{Tx}} R_l > R_u$$

and minimum $$\sum_{l=1}^{C_{Tx}} M_l$$

may be sought, where $M_l$ represents whether carrier 1 is configured as the working carrier of the terminal. If $S_l=0$, it is indicated that carrier 1 is not configured as the working carrier of the terminal, and, in this case, $M_l=0$; if $S_l \geq 0$, it is indicated that carrier 1 is configured as the working carrier of the terminal, and, in this case, $M_l=1$. If the combination $\{S_1, \ldots, S_l, S_{C_{Tx}}\}$ obtained above is used to configure the number of transmit carriers, the service requirement may be fulfilled and the configured number of transmit carriers is minimized.

In practical application, the working carrier of the terminal and the multi-antenna mode used for each carrier may be configured dynamically or the working carrier of the terminal and the multi-antenna mode used for each carrier may be configured half-statically. The configuration may also be performed in a dynamic manner combined with a half-static manner, for example, the working carrier of the terminal is configured half-statically, and the antenna mode used for each carrier is configured dynamically. In the case of dynamic configuration, the update speed of each configuration is high, for example, update once every 2 ms, and the base station generally notifies the update to the terminal by using a layer-1 or a layer-2 control signaling; in the case of half-static configuration, the update speed of each configuration is low, for example, update once at an interval greater than 100 ms, and in this case, the base station generally notifies the update to the terminal by using a layer-3 control signaling. That is to say, the update speed of dynamic configuration is greater than the update speed of half-static configuration. The two are relative concepts. Those skilled in the art can set different update speeds according to practical application requirements.

When the terminal is initially powered on, certain initial configuration may be used. The initial configuration may be fixed setting, so that the initial configuration is the same each time when the terminal is powered on; the initial configuration may also be selected by the terminal autonomously. The terminal may store the configuration at the previous power-off as the initial configuration at the next power-on, which is not limited in this embodiment. At the time of initial configuration, different values may be set based on different practical application requirements. Based on the consideration of power saving of the terminal, in power-on, it may be set that there is only one receive radio frequency chain; based on the consideration of quickening the terminal access, it may be set that multiple receive radio frequency chains serve different receive carriers separately to quicken the initial measurement process; based on the consideration of power saving and receive performance of the terminal, it may further be set that one radio frequency chain is opened for each antenna and the receive radio frequency chains of all antennas receive a same carrier.

If the MIMO technology, such as space time coding, is not used for the initial access signal transmitted by the terminal at the time of initial access, the preferential initial setting of the transmit radio frequency chain is to open only one radio frequency chain of one antenna. If the MIMO technology may be used for the initial access signal, based on the consideration of energy saving of the UE and the current channel status, a single radio frequency chain of a single antenna may be selected for transmission; or, multiple antennas are selected, each antenna uses one radio frequency chain, and all transmit radio frequency chains use a same transmit carrier. When the terminal performs initial access, for the selection of a single antenna or multiple antennas, the energy-saving requirement of the UE and the current channel status are primarily taken into consideration. If the current channel status is relatively good, a single antenna may be used for transmission; if the current channel quality is relatively poor, multiple antennas may be used for transmission. To quicken the initial access process, the terminal may use multiple carriers to transmit uplink signals simultaneously, and set each transmit radio frequency chain to serve a different transmit carrier.

Those skilled in the art may understand that the method for configuring a receive carrier and a receive radio frequency chain is similar to the method for configuring a transmit carrier and a transmit radio frequency chain, which are not detailed in this embodiment any further. In practical application, the transmit resources and the receive resources of the terminal may be configured separately, and the base station may complete the configuration and notify the configuration to the terminal, or the terminal itself may perform the configuration. Also, the configuration of the transmit carrier and the receive carrier may not be separated. For example, the transmit carriers are configured as a subset of the receive carriers, that is, the transmit carriers are configured as a part of the receive carriers; or the receive carriers are configured as a subset of the transmit carriers, which is not limited in this embodiment.

By using the technical solution described in the embodiments of the present invention, the resource configuration may be preformed according to specific requirements. For example, the number of radio frequency chains may be made to be minimized; the number of carriers may be made to be minimized; or the transmit or receive power may be made to be the lowest, so that the carriers and the radio frequency chains of the terminal equipment are configured flexibly, and the service requirement of the terminal are fulfilled by using the least resources. For example, the terminal may be made to open the least radio frequency chains, thereby achieving a goal of power saving. In the prior art, each carrier needs all antennas, and a case of wasting of resources exists. For example, it is assumed that: the peak spectrum efficiency is 7.5 bps/Hz in a case of a single antenna, and the peak spectrum efficiency is 15 bps/Hz in a case of two antennas; the bandwidth of each carrier is 20 MHz; and each radio frequency chain supports data of 15 MHz. If the service rate of the terminal is 700 MHz, according to the prior art, each carrier uses all antennas, and the terminal needs to use 3 carriers, where each carrier has 2 antenna connectors, and 6 radio frequency chains are required in total; according to the configuration method used in the embodiment of the present invention, only 3 carriers need to be configured, where 2 carriers use 2 antennas and 1 carrier uses a single antenna, and 5 radio frequency chains in total can meet the service requirement, and thereby, the radio frequency chains can be saved. When performing the resource configuration according to specific requirements, the base station may comprehensively consider a current radio environment. The radio environment may include such information as a service rate required by the terminal, a status of a channel from the base station to the terminal, maximum transmit power of the base station, a frequency resource allocation state of the base station, a maximum transmit power margin of the terminal, and an interference state of each carrier of the base station.

Those skilled in the art can understand that the user equipment referred to in the embodiments of the present invention may be a terminal, a database, a base station, or an access point of any form. If the entity for configuring resources and the user equipment are not a same device, it is required to report the capability of the user equipment to the entity for configuring resources; if the entity for configuring resources is the user equipment itself, the user equipment itself may perform configuration, and it is not required to report the capability of the user equipment.

Figure 4:
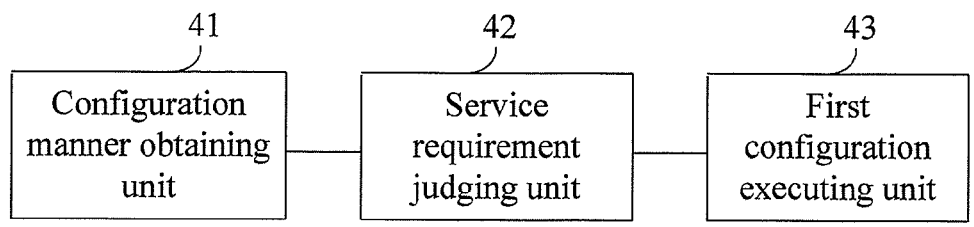
FIG. 4 is a schematic diagram of a resource configuration device according to an embodiment of the present invention.

Corresponding to the method embodiment above, an embodiment of the present invention provides an embodiment of a resource configuration device. FIG. 4 is a schematic diagram of a resource configuration device according to an embodiment of the present invention. The device includes:

a configuration manner obtaining unit 41, configured to obtain a capability of a user equipment, and obtain multiple resource configuration manners according to the capability of the user equipment, where the capability of the user equipment include the number of antennas of the user equipment and the number of radio frequency chains that corresponds to each antenna, and each resource configuration manner includes the number of component carriers that is configured for the user equipment and a state of a radio frequency chain used by each component carrier;

a service requirement judging unit 42, configured to obtain a resource configuration manner in which data bearing capacity meets a service requirement from the multiple resource configuration manners; and a first configuration executing unit 43, configured to: when it is required to save power of the user equipment, select a resource configuration manner in which the least radio frequency chains are used from the resource configuration manners in which the data bearing capacity meets the service requirement, and in the resource configuration manner in which the least radio frequency chains are used, configure, for the user equipment, a component carrier and the radio frequency chain used by each component carrier.

The user equipment selects a resource configuration manner in which the least radio frequency chains are used from the resource configuration manners in which the data bearing capacity meets the service requirement, so as to configure resources, which can achieve a beneficial effect of saving power. Further, the device may further include: a second configuration executing unit, configured to: when it is required to save a bandwidth resource, select a resource configuration manner in which the least component carriers are used from the resource configuration manners in which the data bearing capacity meets the service requirement, and in the resource configuration manner in which the least component carriers are used, configure, for the user equipment, a component carrier and the radio frequency chain used by each component carrier. The device may be a base station or the user equipment. When the device is a base station, the device may further include: a notifying unit, configured to notify a result of the resource configuration to the user equipment. When the device is the user equipment, the device may further include: an initial configuring unit, configured to: when the user equipment is powered on initially, configure resources by using an initial configuration manner, where the initial configuration manner includes: configuring one radio frequency chain for the user equipment; or configuring multiple radio frequency chains for the user equipment, and configuring that different radio frequency chains serve different component carriers; or configuring that one radio frequency chain is opened for each antenna, so that the opened radio frequency chain serve a same component carrier.

Persons of ordinary skill in the art may understand that all or part of the steps of the method in the embodiments above may be implemented by a computer program instructing relevant hardware. The program may be stored in a computer readable storage medium. When the program runs, the procedure in the embodiments of the methods above may be included. The storage medium may be a magnetic disk, an optical disk, a read-only memory (Read-Only Memory, ROM), or a random access memory (Random Access Memory, RAM), and so on.

The above descriptions are merely several embodiments of the present invention. According to what is disclosed in the application document, those skilled in the art may make various modifications and variations without departing from the spirit and scope of the present invention. Persons of ordinary skill in the art may understand that the embodiments or the features of different embodiments may be combined into a new embodiment in a case that no conflict occurs.

What is claimed is:

1. A resource configuration method, comprising:

obtaining a capability of a user equipment, and obtaining multiple resource configuration manners according to the capability of the user equipment, wherein the capability of the user equipment comprises the number of antennas of the user equipment and the number of radio frequency chains that corresponds to each antenna, and each resource configuration manner comprises the number of component carriers that is configured for the user equipment and a state of a radio frequency chain used by each component carrier;

obtaining at least one resource configuration manner in which data bearing capacity meets a service requirement from the multiple resource configuration manners; and when it is required to save power of the user equipment, selecting a resource configuration manner in which the least radio frequency chains are used from the at least one resource configuration manner in which the data bearing capacity meets the service requirement, and in the resource configuration manner in which the least radio frequency chains are used, configuring, for the user equipment, a component carrier and the radio frequency chain used by each component carrier.

2. The method according to claim 1, further comprising:

when it is required to save a bandwidth resource, selecting a resource configuration manner in which least component carriers are used from the at least one resource configuration manner in which the data bearing capacity meets the service requirement, and in the resource configuration manner in which the least component carriers are used, configuring, for the user equipment, a component carrier and the radio frequency chain used by each component carrier.

3. The method according to claim 1, further comprising:

notifying, by a base station, a result of the resource configuration to the user equipment, after completing the resource configuration method.

4. The method according to claim 1, further comprising:

when the user equipment is powered on initially, configuring resources by using an initial configuration manner, wherein the initial configuration manner comprises: configuring one radio frequency chain for the user equipment; or configuring multiple radio frequency chains for the user equipment and configuring that different radio frequency chains serve different component carriers; or configuring that one radio frequency chain is opened for each antenna, so that the opened radio frequency chain serve a same component carrier.

5. The method according to claim 1, wherein:

the resource configuration method is used dynamically or half-statically to configure resources.

6. A resource configuration device, comprising:

a configuration manner obtaining unit, configured to obtain a capability of a user equipment, and obtain multiple resource configuration manners according to the capability of the user equipment, wherein the capability of the user equipment comprises the number of antennas of the user equipment and the number of radio frequency chains that corresponds to each antenna, and each resource configuration manner comprises the number of component carriers that is configured for the user equipment and a state of a radio frequency chain used by each component carrier;

a service requirement judging unit, configured to obtain at least one resource configuration manner in which data bearing capacity meets a service requirement from the multiple resource configuration manners; and a first configuration executing unit, configured to: when it is required to save power of the user equipment, select a resource configuration manner in which the least radio frequency chains are used from the at least one resource configuration manner in which the data bearing capacity meets the service requirement, and in the resource configuration manner in which the least radio frequency chains are used, configure, for the user equipment, a component carrier and the radio frequency chain used by each component carrier.

7. The device according to claim 6, further comprising:

a second configuration executing unit, configured to: when it is required to save a bandwidth resource, select a resource configuration manner in which the least component carriers are used from the at least one resource configuration manner in which the data bearing capacity meets the service requirement, and in the resource configuration manner in which the least component carriers are used, configure, for the user equipment, a component carrier and the radio frequency chain used by each component carrier.

8. The device according to claim 6, wherein:

the device is a base station or the user equipment.

9. The device according to claim 8, wherein: when the device is a base station, the device further comprises:

a notifying unit, configured to notify a result of the resource configuration to the user equipment.

10. The device according to claim 8, wherein: when the device is the user equipment, the device further comprises:

an initial configuring unit, configured to: when the user equipment is powered on initially, configure resources in an initial configuration manner, wherein the initial configuration manner comprises: configuring one radio frequency chain for the user equipment; or configuring multiple radio frequency chains for the user equipment and configuring that different radio frequency chains serve different component carriers; or configuring that one radio frequency chain is opened for each antenna, so that the opened radio frequency chain serve a same component carrier.

* * * * *